United States Patent [19]

Ishigaki

[11] Patent Number: 5,361,310
[45] Date of Patent: Nov. 1, 1994

[54] HANDWRITING ENTRY PROCESSING SYSTEM USING KEYBOARD AND MOUSE INTERFACES REQUIRING NO MODIFICATION OF AN APPLICATION PROGRAM

[75] Inventor: Kazushi Ishigaki, Kawasaki, Japan

[73] Assignee: Fujitsu Limited, Kawasaki, Japan

[21] Appl. No.: 31,282

[22] Filed: Mar. 12, 1993

Related U.S. Application Data

[63] Continuation of Ser. No. 944,034, Sep. 11, 1992, abandoned, which is a continuation of Ser. No. 643,043, Jan. 18, 1991, abandoned.

[30] Foreign Application Priority Data

Jan. 19, 1990 [JP] Japan ............................ 2-11121

[51] Int. Cl.⁵ ............................................ G06K 9/00
[52] U.S. Cl. .................................. 382/13; 364/709.11
[58] Field of Search ................... 382/13, 3; 340/706, 340/707, 708; 364/709.11, 237.6, 927.6; 178/18; 345/104, 179

[56] References Cited

U.S. PATENT DOCUMENTS

| | | | |
|---|---|---|---|
| 4,727,588 | 2/1988 | Fox et al. | 382/13 |
| 4,860,372 | 8/1989 | Kuzunuki et al. | 382/13 |
| 4,884,068 | 11/1989 | Matheny et al. | 340/707 |
| 4,926,010 | 5/1990 | Citron | 178/18 |
| 5,008,854 | 4/1991 | Maeda et al. | 364/900 |
| 5,049,862 | 9/1991 | Dao et al. | 340/706 |
| 5,063,600 | 11/1991 | Norwood | 382/13 |
| 5,148,155 | 9/1992 | Martin et al. | 340/712 |
| 5,199,068 | 3/1993 | Cox | 380/23 |
| 5,202,844 | 4/1993 | Kamio et al. | 364/709.11 |

FOREIGN PATENT DOCUMENTS

| | | | |
|---|---|---|---|
| 0020561 | 2/1980 | Japan | 340/707 |
| 0108971 | 7/1982 | Japan | 340/707 |
| 0070348 | 4/1983 | Japan | 340/707 |
| 63-231586 | 9/1988 | Japan | G06K 9/62 |

OTHER PUBLICATIONS

Rosch, "Pencept Penpad 300; Penpad 310; Penpad 320. (Hardware Review)", PC Magazine, vol. 8, No. 20, pp. 262–264, Nov. 28, 1989.
Webster, "Personal Writer 15SL 1.1", MacWorld, vol. 6, No. 1, Jan. 1989, pp. 164–166.
Zibler, "See Mac Read", MacUser, vol. 4, No. 3, Mar. 1988, pp. 206–215.
Dennis Normile et al., Computers Without Keys, Aug. 1990, pp. 66–69 Popular Science.

Primary Examiner—David K. Moore
Assistant Examiner—Andrew W. Johns
Attorney, Agent, or Firm—Staas & Halsey

[57] ABSTRACT

A handwriting entry processing system used in a tablet type handwriting entry device includes a display unit, an area decision unit, a recognition processing unit, a designation unit and an input/output processing unit. The display unit has a planar display portion and an entry tablet portion, these portions being integratedly constituted in the display unit. The planar display portion displays an output signal from the input/output processing unit. The entry tablet portion constituted by one plane has a first entry portion and a second entry portion, the first entry portion being superimposed on the planar display portion and the second entry portion being located outside of the planar display portion. These entry portions receive a designation signal from the designation unit and output coordinate data to the area decision unit. The area decision unit detects the coordinate data from the entry tablet, transfers the co-ordinate data to the input/output processing unit when the coordinate data is generated from the first entry portion, and transfers the coordinate data to the recognition processing unit when the coordinate data is generated from the second entry portion. The recognition processing unit receives the signal input from the area decision unit, performs a recognition operation on the handwriting character based on the coordinate data, and outputs the resultant data indicating the characters to the input/output processing unit.

10 Claims, 8 Drawing Sheets

HANDWRITING ENTRY PROCESSING SYSTEM USING KEYBOARD AND MOUSE INTERFACES REQUIRING NO MODIFICATION OF AN APPLICATION PROGRAM

This application is a continuation of application Ser. No. 07/944,034, filed Sep. 11, 1992, now abandoned, which is a continuation of application Ser. No. 07/648,043, filed Jan. 18, 1991, now abandoned.

BACKGROUND OF THE INVENTION

1. Field of the Invention

The present invention relates to a handwriting entry processing system used in a tablet type handwriting entry/display device having a display portion and an entry tablet portion integrated into the device.

2. Description of the Related Art

Recently, handwriting entry/display devices have been widely used in information processing fields. Usually, the conventional handwriting entry device has a planar display portion and entry tablet portion integrated on a display unit. This type of device is called an "integrated type entry/display tablet". A user writes various information, such as characters, symbols, and the like, on a coordinate entry portion by using a stylus pen.

There are known handwriting entry/display devices having the integrated type entry/display tablet on the market. These devices are referred to, for example, in COMPUTERS WITHOUT KEYS" by Dennis Normile and J. T. Johnson, on pages 66 to 69, August, 1990, POPULAR SCIENCE (magazine).

SUMMARY OF THE INVENTION

The object of the present invention is to provide a handwriting entry processing system using a tablet type handwriting entry enabling easy handwritten entry of various information without changing a current layout of the display, and without changing conventional application programs.

In accordance with the present invention, there is provided a handwriting entry processing system used in a tablet type handwriting entry/display device which includes a display unit, an area decision unit, a recognition processing unit, a designation unit and an input-/output processing unit.

The display unit has a planar display portion and an entry tablet portion being integrated in the display unit. The planar display portion displays signal output from the input/output processing unit. The entry tablet portion has a first entry portion and a second entry portion, the first entry portion being superimposed on the planar display portion and the second entry portion being located outside of the planar display portion. These entry portions receive a designation signal from the designation unit and output coordinate data to the area decision unit.

The area decision unit detects the coordinate data from the entry tablet, transfers the coordinate data to the input/output processing unit when the coordinate data is generated from the first entry portion, and transfers the coordinate data to the recognition processing unit when the coordinate data is generated from the second entry portion.

The recognition processing unit receives the signal input from the area decision unit, performs a recognition operation on the handwriting character based on the coordinate data, and outputs the resultant data to the input/output processing unit.

In one embodiment of the present invention, a second planar display is provided in the second entry portion of the entry tablet superimposed on the second entry portion; the recognition processing unit has a display processing unit which outputs a signal to the second planar display to display a handwritten character based on the coordinate data.

In another embodiment, the display unit has a first entry tablet portion and a second entry tablet portion, a planar display portion and the first entry tablet portion integrated in the display unit, and a second planar display portion and the second entry tablet portion integrated in the display unit.

DESCRIPTION OF THE PREFERRED EMBODIMENTS

Figure 1:
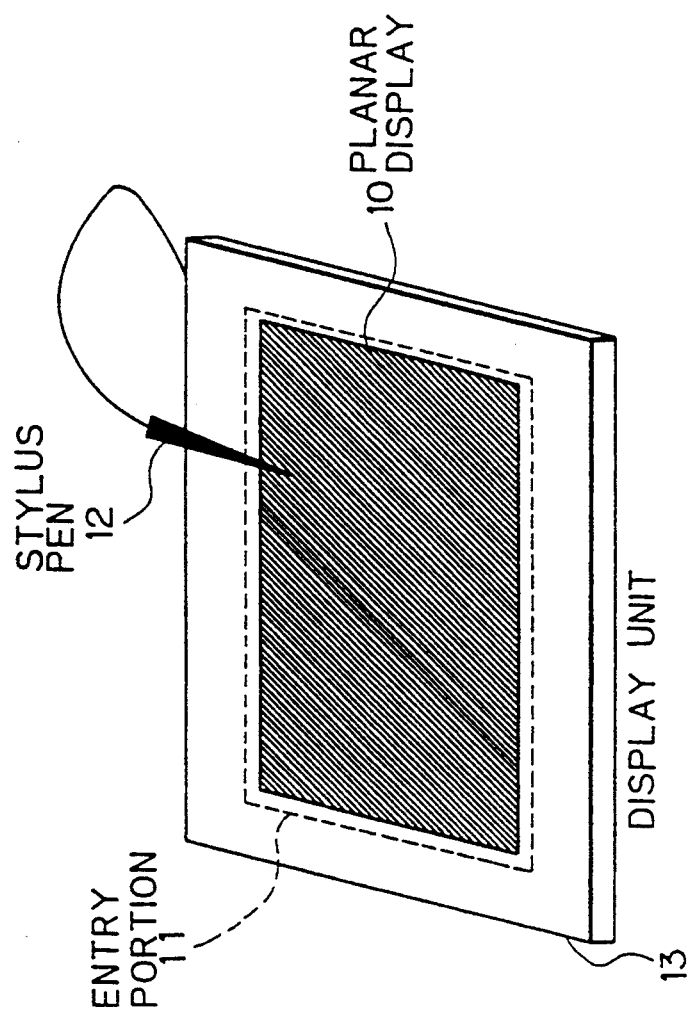
FIG. 1 is an outer view of a conventional handwriting entry device having an integrated type entry/display tablet.

FIG. 1 is an outer view of a conventional handwriting entry device having an integrated type entry/display tablet. This type of conventional art is disclosed, for example, in Japanese Unexamined Patent Publication (Kokai) No. 63-231586 ("Handwriting Information Processing Device", Toshiba Co., filed on May 20, 1987).

In FIG. 1, reference 10 denotes a planar display portion constituted by, for example, crystalline liquid elements, 11 and entry portion, 12 a stylus pen, and 13 a display unit. The entry portion 11 includes a coordinate entry portion and is superimposed on the display portion 10 as shown by a dotted line.

With this device, a user can input various information, for example, characters, on the entry portion 11 by using the stylus pen, without use of a keyboard. That is, the position touched by the stylus pen on the entry portion 11 is read as coordinate data, and the character is displayed on the display portion 10 based on the coordinate data. Further, various functions can be designated by the handwriting entry.

As shown in FIG. 1, in the conventional art, the entry portion 11 is provided on the entire planar display portion 10. Accordingly, the already displayed layout of the display portion 10 is changed for every handwriting entry operation. As a result, it is necessary to modify an original application program to change the layout.

Figure 2:
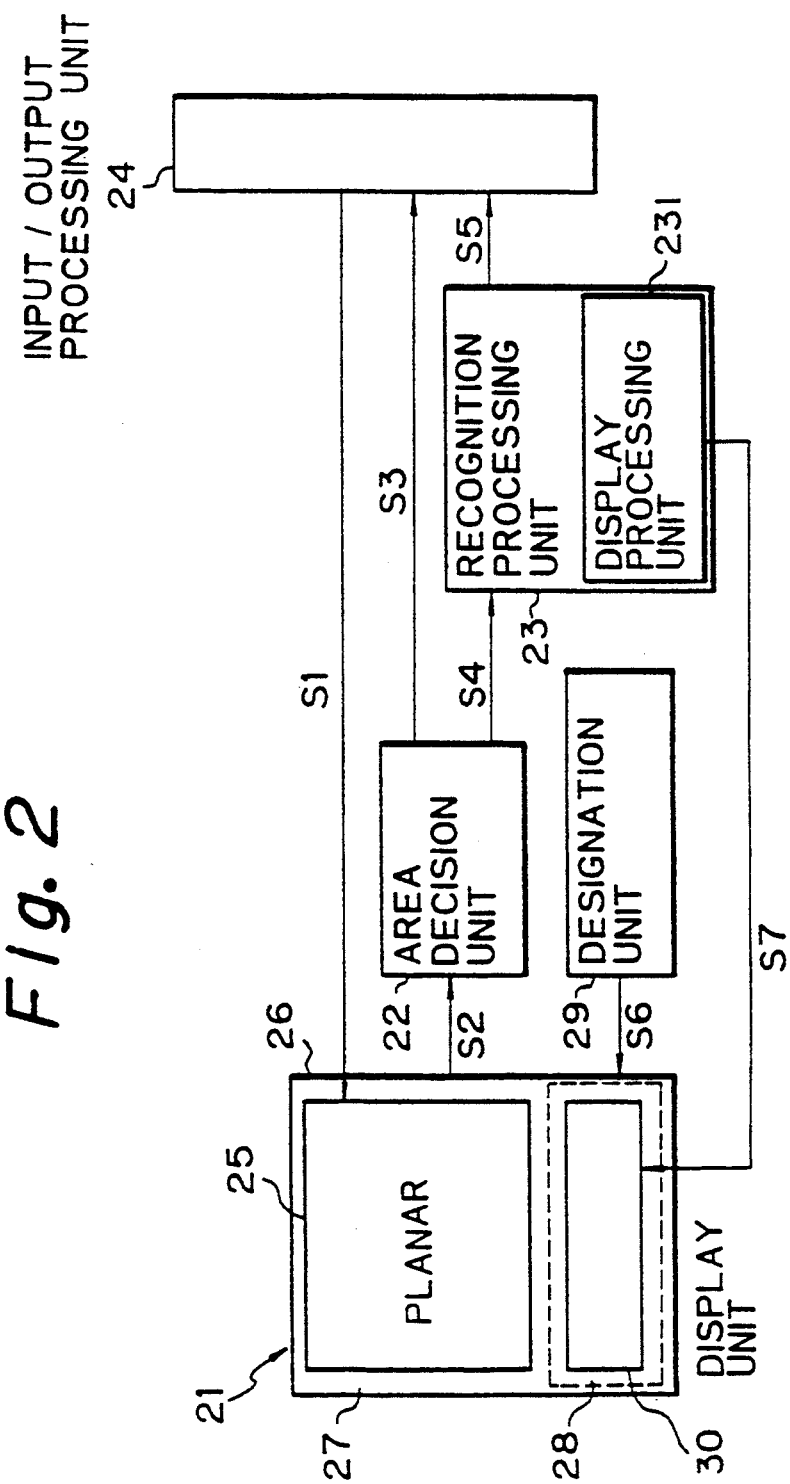
FIG. 2 is basic block diagram of a handwriting entry/display processing system according to the present invention.

FIG. 2 is basic block diagram of a handwriting entry processing system according to the present invention. In FIG. 2, reference number 21 denotes a display unit, 22 an area decision unit, 23 a recognition processing unit including a display processing unit 231, and 24 an input-/output processing unit. The display unit 21 comprises a planar display 25 and an entry tablet 26. The planar display 25 and the entry tablet 26 are integrated in the display unit 21.

The planar display 25 displays a signal S1 output from the input/output processing unit 24. The entry tablet 26 comprises a first entry portion 27 integrated with the planar display 25 and a second entry portion 28 located outside of the planar display 25. The entry tablet 26 generates coordinate data S2 when a signal S6 indicating an output operation is input from a designation unit 29.

The area decision unit 22 receives a signal S2 input from the entry tablet 26 and determines whether the input signal S2 is input from the first entry portion 27 or from the second entry portion 28. When the signal S2 is input from the first entry portion 27, the area decision unit 22 outputs a signal S3 to the input/output processing unit 24. When the signal S2 is input from the second entry portion 28, the area decision unit 22 outputs a signal S4 to the recognition processing unit 23. Then, a character recognition operation is performed by the recognition processing unit 23 and a resultant signal S5 is output to the input/output processing unit 24.

A second planar display 30 may also be provided in the second entry portion 28. In this case, the second planar display 30 is superimposed on the second entry portion 28. The display processing unit 231 provided in the recognition processing unit 23 outputs a signal S7 to the second planar display 30 for displaying the handwriting character based on the coordinate of the signal S4.

In the present invention, since the handwriting entry portion is provided on the second planar display 30 which is located outside of the planar display 25, it is possible to maintain the original layout on the planar display 25 without being influenced by the handwriting entry.

Further, in the present invention, since the resultant signal S5 from the recognition processing unit 23 is input to the input/output processing unit 24 through an interface of a conventional keyboard, it is not necessary to modify the application program used in the input-/output processing unit 24. Accordingly, it is possible to achieve the present invention with relatively simple construction.

Figure 3:
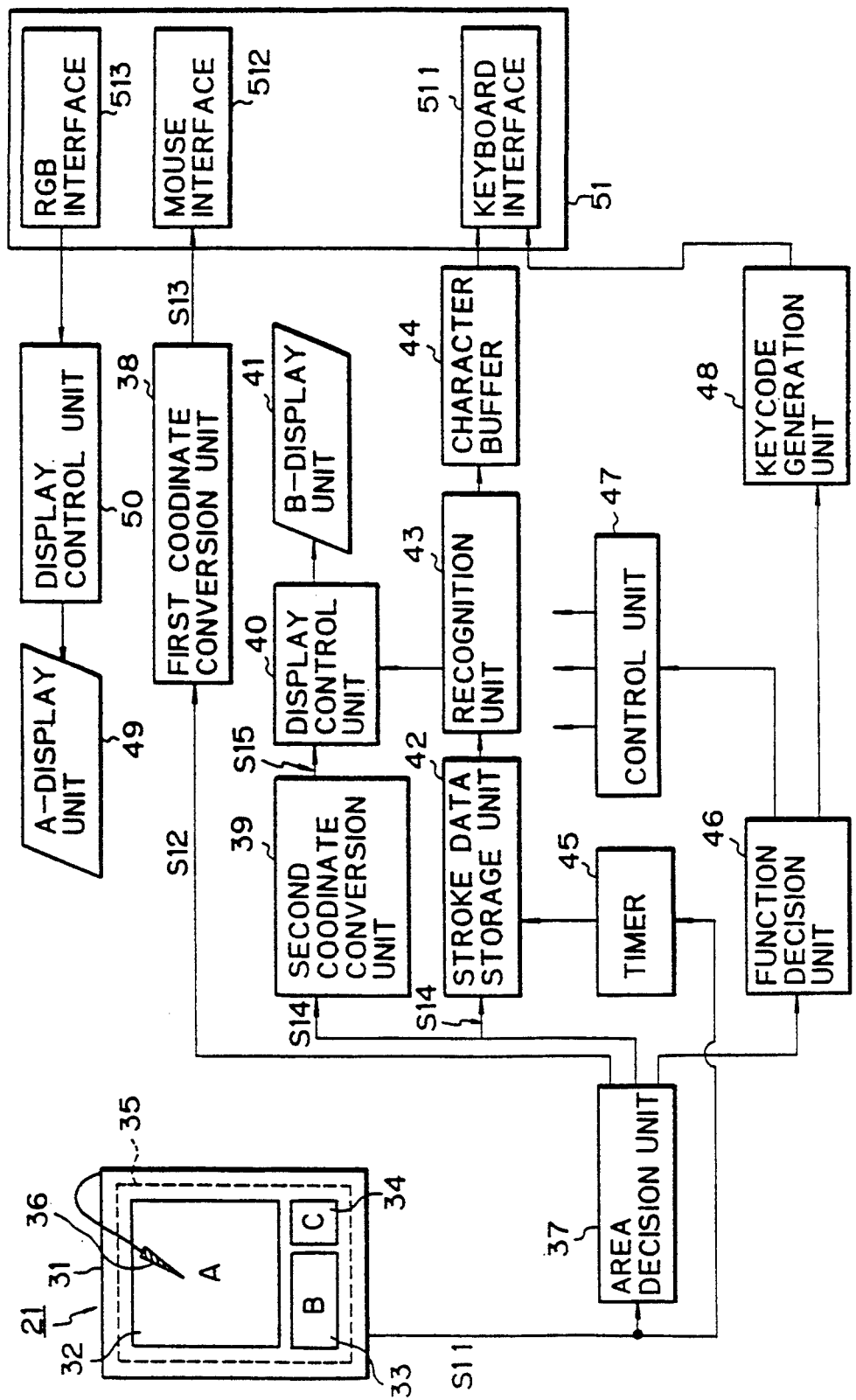
FIG. 3 is a detailed block diagram of the handwriting entry processing system according to a first embodiment of the present invention.
Figure 4:
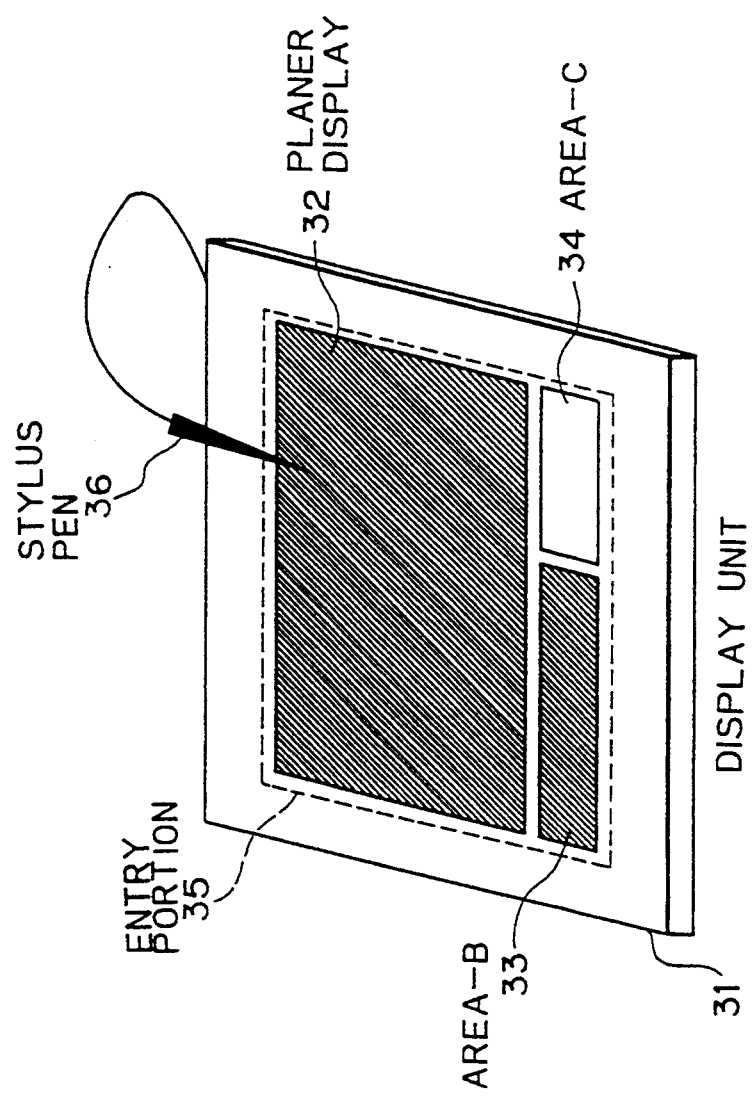
FIG. 4 is an outer view of a handwriting entry device having an entry/display integration type tablet according to the first embodiment.

FIG. 3 is a detailed block diagram of the handwriting entry processing system according to a first embodiment of the present invention, and FIG. 4 is an outer view of a handwriting entry device having an integrated type entry/display tablet according to the first embodiment.

In FIG. 3, as explained above, the display unit 21 includes the entry tablet 31 and the display portions 32 to 34 as the integrated type entry/display tablet. The planar display portion 32 (area A), the second planar display portion 33 (area B), and function entry portion 34 (area C) are integrated on the entry portion 35. The area C is used for inputting various functions. The planar display 32 (area A) and the second planar display 33 (area B) are constituted by the liquid crystal elements.

The resolution of the planar display 32 is 640×400 (dots), and that of the planar display 33 is 280×60 (dots).

The arrangement of each area A, B, and C on the entry tablet 31 is shown as one example of how these areas can be arranged. The most important point, however, is the fact that the handwriting entry area B is located outside of the display area A.

When the user writes a character on the entry portion 35 by using the stylus pen 36, the coordinate data S11 of the stylus pen 36 is input to an area decision unit 37, and the area decision unit 37 detects the position of the coordinate data S11.

When the coordinate data S11 is within the area A, the coordinate data S12 from the area decision unit 37 is transferred to a first coordinate conversion unit 38. The first coordinate conversion unit 38 converts the coordinate data S12 to dot coordinate data S13 on the area A. The dot coordinate data S13 is input to a mouse interface unit 512 in a computer 51. The computer 51 corresponds to the input/output processing unit 24 shown in FIG. 2. In the computer 51, the dot coordinate data S13 is processed by the mouse interface unit 512 in the same processing way as a cursor position is designated on the display by using a mouse. The information displayed on an A-display unit 49 is transferred from an RGB interface unit 513 through a display control unit 50. This display is performed in the conventional manner in the computer 51.

When the coordinate data S11 is within the area B, the coordinate data from the area decision unit 37 is transferred to a second coordinate conversion unit 39 and a stroke data storage unit 42. The second coordinate conversion unit 39 converts the coordinate data S14 to a dot coordinate data S15 for coordinates on the area B. The dot coordinate data S15 is input to a B-display unit 41 for the area B through a display control unit 40. Accordingly, the handwriting entry by the stylus pen 36 is displayed on the area B.

Further, the stroke data storage unit 42 stores the coordinate data S14 input from the area decision unit 37, and detects the change of the coordinate data S14. A timer 45 checks the entry state of the coordinate data S11 input from the entry tablet 31, and detects whether or not the entry of one character by handwriting is completed on the entry portion 35.

If no further handwriting is input during a predetermined time (for example, 1 second), the timer 45 determines the completion of the entry of one character, and this completion of the entry is output to the stroke data storage unit 42. When the stroke data storage unit 42 receives this information from the timer 45, the stroke data storage unit 42 transfers the coordinate data just previously stored therein to a recognition unit 43, and starts to store new coordinate data of a next character.

The recognition unit 43 detects a character from the group of coordinate data of the handwriting entry, and determines a character code of the detected character. The character code is stored in a character buffer 44. The recognition unit 43 then transfers the character code to the display control unit 40 so that the character corresponding to the character code is displayed on the area B of the B-display unit 41.

The character code stored in the character buffer 44 is input to keyboard interface unit 511 in the computer 51. Accordingly, it is possible to handle the handwriting character in the same processing way as the entry of a character from a keyboard.

When the coordinate data S11 is entered in the area C, the coordinate data from the area decision unit 37 is transferred to a function decision unit 46. The function decision unit 46 determines a function corresponding to the coordinate data S11 based on a definition of the function which is previously defined, and this function is transferred to a control unit 47 or a keycode generation unit 48 in accordance with the type of function.

The control unit 47 is provided for controlling all of the units. The keycode generation unit 48 generates a keycode corresponding to a function, and transfers the keycode to the keyboard interface 511 in the computer 51.

Figure 5:
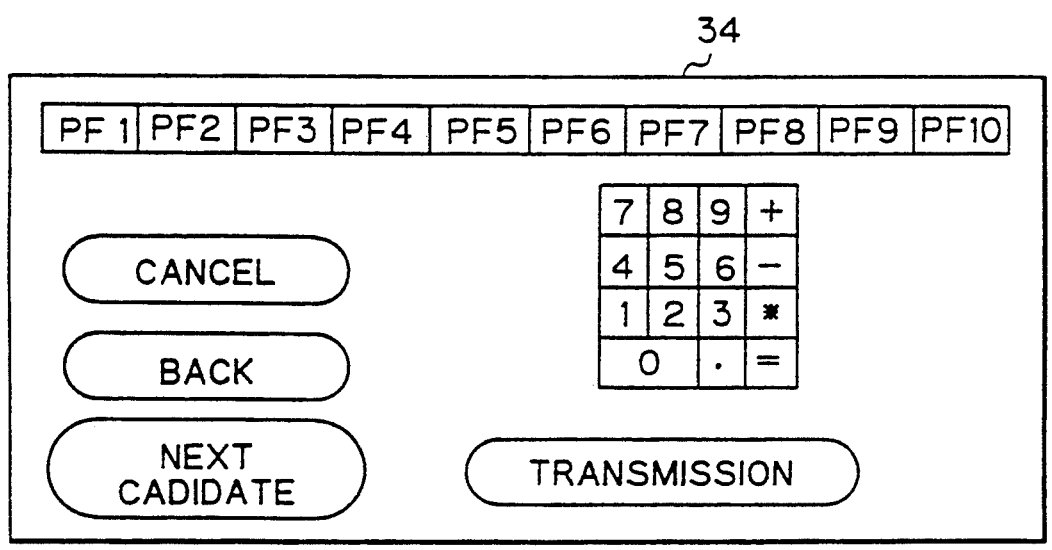
FIG. 5 is one example of display on a function entry portion shown in FIG. 4.

FIG. 5 is one example of a display on the function entry portion. PF1 to PF10 denote various functions. As explained above, the function entry portion is provided in the area C on the display unit 36. The "TRANSMISSION" position is used for transmitting a character on the area B to the computer 51. Other positions, i.e., "CANCEL", "BACK" and "NEXT CANDIDATE" are also provided.

Figure 6:
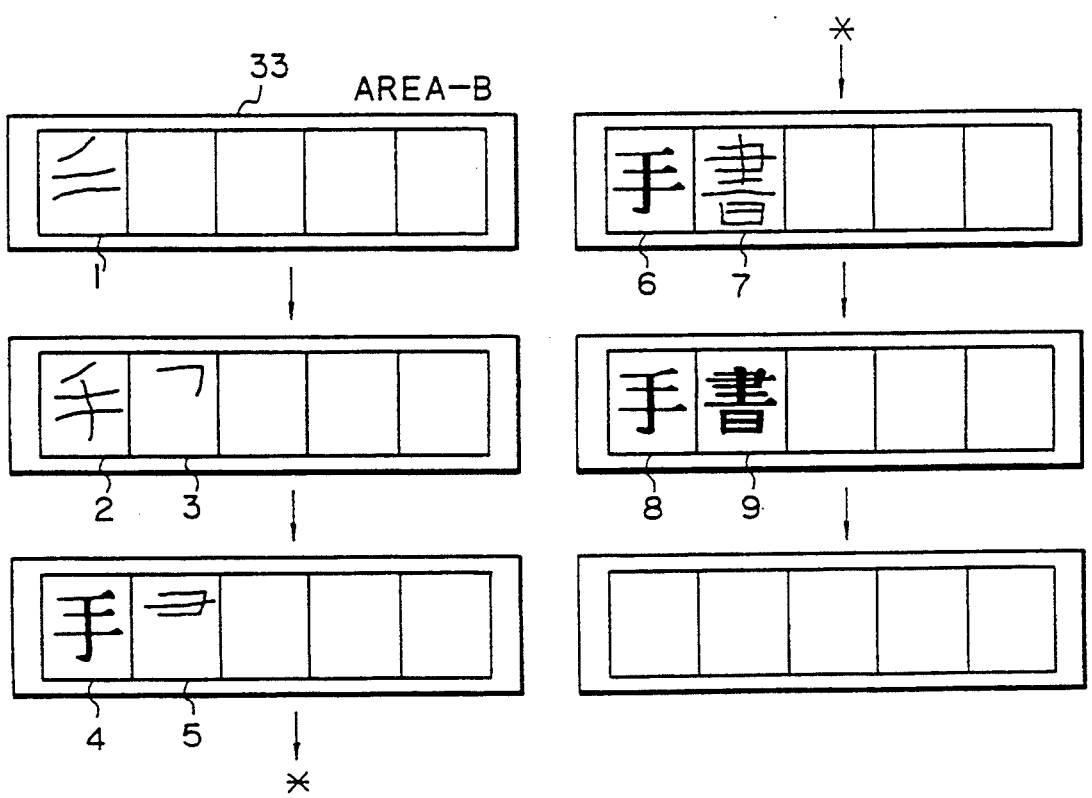
FIG. 6 is a view for explaining handwriting entry on an area B shown in FIG. 4.

FIG. 6 is a view for explaining handwriting entry on the area B. The handwritten Japanese characters "te-gaki" (meaning "handwriting" in English) are written on the area B. The numbers 1 to 3, 5, and 7 show the handwriting process. The numbers 4, 6, 8, and 9 show the characters after recognition by the recognition unit 43. The characters 8 and 9 are transferred to the computer 51. After transfer of charcters 8 and 9, the area B returns to a blank state for a next handwriting entry.

Figure 7:
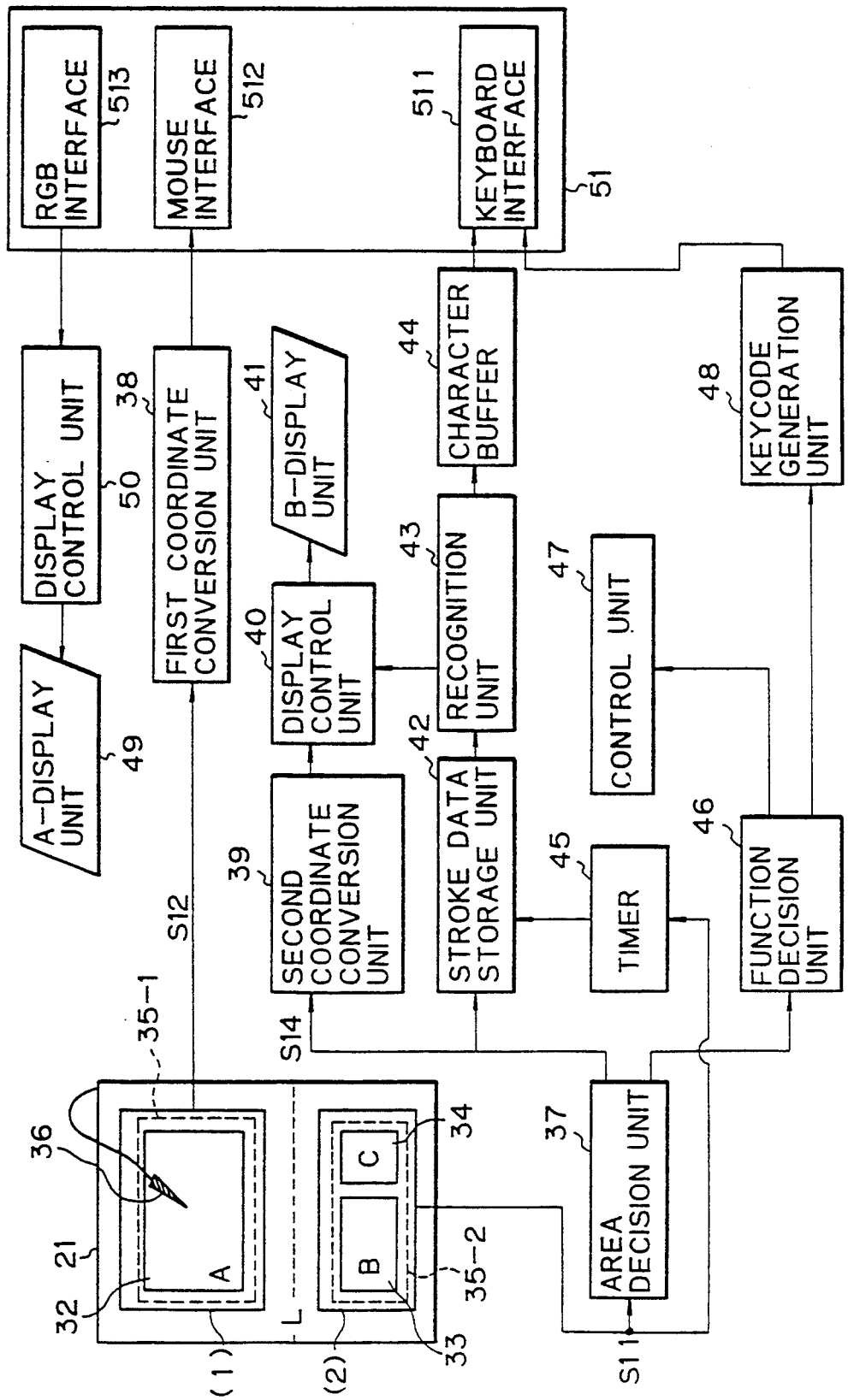
FIG. 7 is a detailed block diagram of a handwriting entry processing system according a second embodiment of the present invention.
Figure 8:
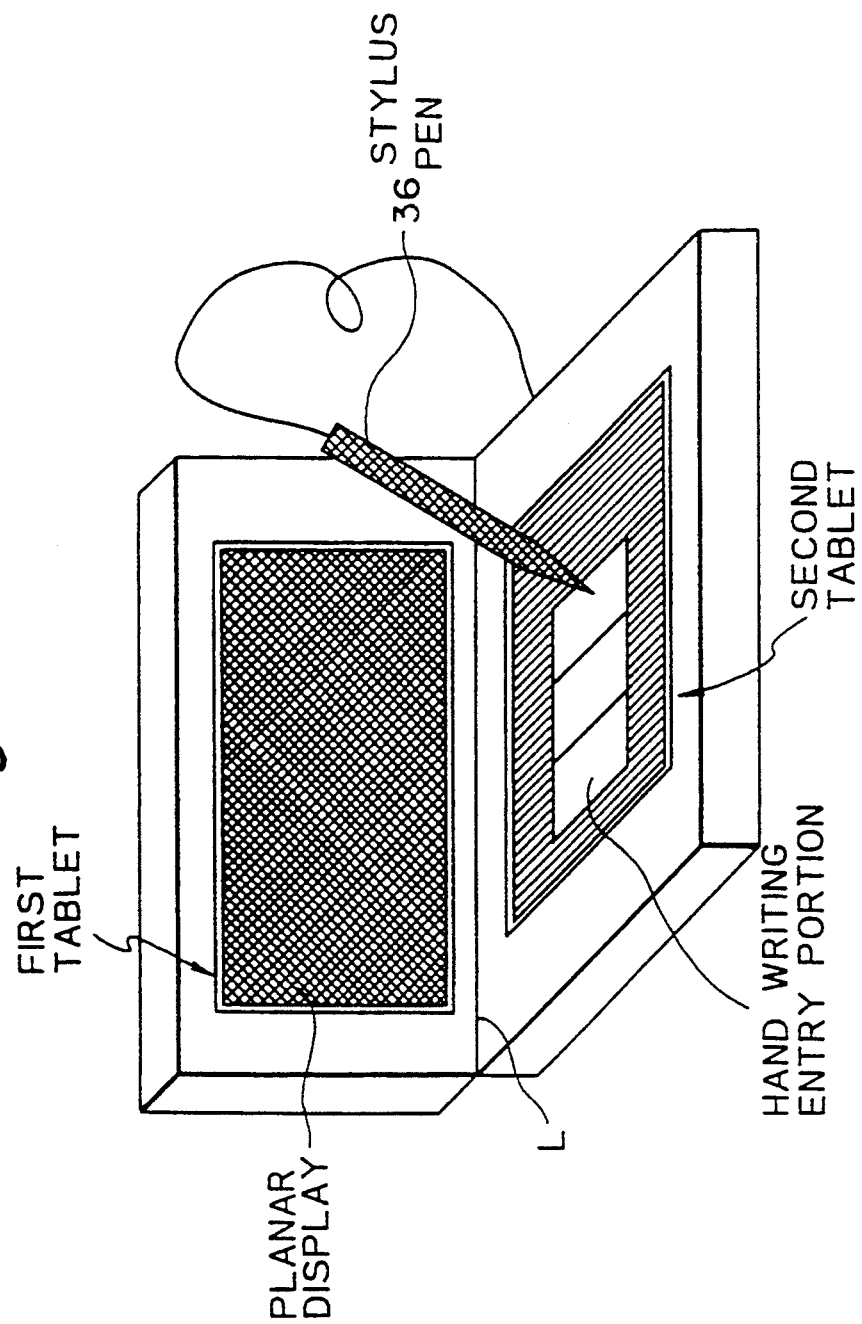
FIG. 8 is an outer view of a handwriting entry device having an entry/display integration type tablet according to the second embodiment.

FIG. 7 is a detailed block diagram of the handwriting entry processing system according to a second embodiment of the present invention, and FIG. 8 is an outer view of a handwriting entry device having an integrated type entry/display tablet according to the second embodiment.

In FIG. 7, the same reference numbers as used in FIG. 3 are attached to the same components in this drawing. As explained above, in the first embodiment shown in FIG. 3, area A, B and C are included in one entry portion 35 (dotted line). Accordingly, the first embodiment is a one tablet type device. In the second embodiment, the entry portion 35 is divided into two portions 35-1 and 35-2. The first entry portion 35-1 includes the display area A, and the second entry portion 35-2 includes the area B and the area C. Accordingly, the second embodiment is a two tablet type, handwriting entry system including a first tablet (1) and second tablet (2).

The coordinate data S12 from the first tablet (1) is directly input to the coordinate conversion unit 38, and the area decision unit 37 receives only the coordinate data S11 from the second tablet (2). Accordingly, the area decision unit 37 detects whether the coordinate data S11 is output from the area B or from the area C. Further, as shown in FIG. 8, this handwriting entry device can fold along a line L so that it is easy for the user to handle this device.

I claim:

1. A handwriting entry processing system used in a tablet type handwriting entry/display device, said handwriting entry processing system comprising:
   a display including
      a planar display portion displaying an output signal, and
      an entry tablet portion with one plane having a first entry portion superimposed on the planar display portion and a second entry portion located outside of the planar display portion, said first and second entry portion receiving a designation signal and outputting coordinate data;
   area decision means, coupled to said display, for detecting the coordinate data from the entry tablet portion, and for transferring coordinate data;
   an input/output processing unit, coupled to said area decision means and having keyboard and mouse interfaces using an application program of a personal computer, for receiving at the mouse interface a signal responsive to coordinate data transferred by said area decision means from the first entry portion, receiving character data at the keyboard interface from the second entry portion, and generating the output signal based on at least one of the signal responsive to the coordinate data from the first entry portion and the character data, without requiring modification of the application program; and
   recognition processing means, coupled between said area decision means and said input/output processing unit, for receiving from said area decision means a signal responsive to the coordinate data from the second entry portion, performing a recognition operation of a handwriting character based on the signal responsive to the coordinate data from the second entry portion, and outputting corresponding character data to said input/output processing unit.

2. A handwriting entry processing system as claimed in claim 1, wherein the second entry portion has a second planar display superimposed thereon, and wherein the recognition processing means has a display processing unit for outputting a signal to the second planar display for displaying the handwriting character.

3. A handwriting entry processing system as claimed in claim 1, wherein a second planar display portion is provided in addition to the first planar display portion and the second entry portion located outside the planar display portion is superimposed on the second planar display portion.

4. A handwriting entry processing system for use with a stylus, comprising:
   a display including first and second areas;
   an entry tablet superimposed over the display, having a first entry portion superimposed on the first area and a second entry portion superimposed on the second area, the first and second entry portions outputting first and second coordinate data in response to manipulation of the stylus in the first and second entry portions, respectively;
   a recognition unit coupled to the display, for receiving the second coordinate data and for generating recognized character data based on the second coordinate data; and
   an input/output processor coupled to the display and the recognition unit, and having mouse and keyboard interfaces, for receiving the first coordinate data at the mouse interface and generating a display in the first area based on the first coordinate data, and for receiving the recognized character data at the keyboard interface, and for displaying the recognized character in the first area,
   an application program operating the mouse and keyboard interfaces requiring no modification.

5. A handwriting entry processing system as claimed in claim 4, further comprising:

a display control unit coupled to the recognition unit, for generating a display in the second area based on the second coordinate data.

6. A handwriting entry processing system used in a tablet type handwriting entry/display device, said handwriting entry processing system comprising:

a display including
a planar display portion displaying an output signal, and
an entry tablet portion with one plane having a first entry portion superimposed on the planar display portion and a second entry portion located outside of the planar display portion, said first and second entry portions receiving a designation signal and outputting coordinate data;
area decision means, coupled to said display, for detecting the coordinate data from the entry tablet portion, and for transferring the coordinate data;
an input/output processing unit of a personal computer, coupled to said area decision means, recognition means and the planar display portion and having display, keyboard and mouse interfaces using an application program of a personal computer, for receiving a display signal from the personal computer at the display interface and generating an output signal for the planar display portion so that the planar display portion displays the application program, receiving a signal responsive to coordinate data transferred by said area decision means from the first entry portion and generating display coordinate data at the mouse interface, receiving character data at the keyboard interface from the second entry portion, and generating the output signal based on at least one of the signal responsive to the coordinate data and the character data, without requiring modification of the application program; and
recognition processing means, coupled between said area decision means and said input/output processing unit, for receiving from said area decision means a signal responsive to the coordinate data from the second entry portion, performing a recognition operation of a handwriting character based on the second signal, and outputting corresponding character data to said input/output processing unit.

7. A handwriting entry processing system as claimed in claim 6, wherein the second entry portion has a second planar display superimposed thereon, and wherein the recognition processing means has a display processing unit for outputting a signal to the second planar display for displaying the handwriting character.

8. A handwriting entry processing system as claimed in claim 6, wherein a second planar display portion is provided in addition to the first planar display portion and the second entry portion located outside the planar display portion is superimposed on the second planar display portion.

9. A handwriting entry processing system for use with a stylus, comprising:
a display including first and second areas, the first area being outside of the second area;
an entry tablet superimposed over the display, having a first entry portion superimposed on the first area and a second entry portion superimposed on the second area, the first and second entry portions outputting first and second coordinate data in response to manipulation of the stylus in the first and second entry portions, respectively;
a recognition unit coupled to the display, for receiving the second coordinate data and for generating recognized character data based on the second coordinate data; and
an input/output processor coupled to the display and the recognition unit, and having mouse and keyboard interfaces operated by an application program, for receiving the first coordinate data at the mouse interface and generating a display in the first area based on the first coordinate data and the application program, and for receiving the recognized character data at the keyboard interface, and for displaying the recognized character in the first area using the display interface, based on the recognized character data and the application program, the application program operating the display, mouse and keyboard interfaces requiring no modification.

10. A handwriting entry processing system as claimed in claim 9, further comprising:
a display control unit coupled to the recognition unit, for generating a display in the second area based on the second coordinate data.

* * * * *

UNITED STATES PATENT AND TRADEMARK OFFICE
CERTIFICATE OF CORRECTION

PATENT NO. : 5,361,310
DATED : November 1, 1994
INVENTOR(S) : Kazushi ISHIGAKI

It is certified that error appears in the above-indentified patent and that said Letters Patent is hereby corrected as shown below:

Col. 1, line 49, delete "being".

Signed and Sealed this

Ninth Day of May, 1995

Attest:

BRUCE LEHMAN

Attesting Officer     Commissioner of Patents and Trademarks